(12) United States Patent
Podhajny et al.

(10) Patent No.: US 10,526,731 B2
(45) Date of Patent: Jan. 7, 2020

(54) CONDUCTIVE SIGNAL PATHS IN WOVEN FABRICS

(71) Applicant: Apple Inc., Cupertino, CA (US)

(72) Inventors: Daniel A. Podhajny, San Jose, CA (US); Yohji Hamada, Wakayama (JP); Kathryn P. Crews, Menlo Park, CA (US); Joseph B. Walker, Campbell, CA (US); Daniel D. Sunshine, Sunnyvale, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 15/537,848

(22) PCT Filed: Dec. 1, 2015

(86) PCT No.: PCT/US2015/063257
§ 371 (c)(1),
(2) Date: Jun. 19, 2017

(87) PCT Pub. No.: WO2016/105885
PCT Pub. Date: Jun. 30, 2016

(65) Prior Publication Data
US 2017/0370030 A1    Dec. 28, 2017

Related U.S. Application Data

(60) Provisional application No. 62/095,668, filed on Dec. 22, 2014.

(51) Int. Cl.
*D03D 1/00* (2006.01)
*D03D 3/00* (2006.01)
(Continued)

(52) U.S. Cl.
CPC ........... *D03D 1/0088* (2013.01); *D03D 3/005* (2013.01); *D03D 13/00* (2013.01); *G06F 3/044* (2013.01);
(Continued)

(58) Field of Classification Search
CPC ...... D03D 1/0088; D03D 3/005; D03D 13/00; G06F 3/044
(Continued)

(56) References Cited

U.S. PATENT DOCUMENTS 2,385,577 A    9/1945    Ezekiel
3,495,225 A *  2/1970    Davis .................... C08G 59/50
                                                    29/604

(Continued)

FOREIGN PATENT DOCUMENTS

CH    698983 B1    12/2009
CN    1934302 A    3/2007
(Continued)

*Primary Examiner* — Prabodh M Dharia
(74) *Attorney, Agent, or Firm* — Treyz Law Group, P.C.; Kendall W. Abbasi

(57) ABSTRACT

Weaving equipment may include strand positioning equipment that positions warp strands and that inserts weft strands among the warp strands to form fabric. The weaving equipment may include one or more guide arms that pushes warp strands in the weft direction during weaving. Fabrics having warp strands that extend in both the warp direction and the weft direction may be used in forming circuitry in fabrics such as touch sensor circuitry. For example, a touch sensor in a fabric may be formed using first conductive warp strands that form first touch sensor electrodes and second conductive warp strands that form second touch sensor electrodes that overlap with the first touch sensor electrodes. The second conductive warp strands may each have a first portion that extends in the warp direction and a second (Continued)

portion that extends in the weft direction across the first touch sensor electrodes.

21 Claims, 9 Drawing Sheets

(51) Int. Cl.
 *D03D 13/00* (2006.01)
 *G06F 3/044* (2006.01)
(52) U.S. Cl.
 CPC ............ *D10B 2401/16* (2013.01); *G06F 2203/04102* (2013.01)
(58) Field of Classification Search
 USPC ........... 345/174; 139/388; 368/282; 361/220
 See application file for complete search history.

(56) References Cited

U.S. PATENT DOCUMENTS

| | | | | |
|---|---|---|---|---|
| 4,538,054 | A * | 8/1985 | de la Bretoniere | D02G 3/12 219/545 |
| 4,754,285 | A | 6/1988 | Robitaille | |
| 4,878,148 | A * | 10/1989 | Hee | A61N 1/14 361/220 |
| 6,210,771 | B1 * | 4/2001 | Post | H05K 3/10 428/100 |
| 7,236,010 | B1 | 6/2007 | Jung et al. | |
| 7,365,031 | B2 * | 4/2008 | Swallow | D02G 3/38 174/124 R |
| 8,127,623 | B2 * | 3/2012 | Son | G01L 5/228 178/18.06 |
| 10,145,036 | B1 * | 12/2018 | Sunshine | D03D 1/0088 |
| 10,156,029 | B1 * | 12/2018 | Podhajny | G06F 3/042 |
| 10,174,444 | B1 * | 1/2019 | Podhajny | D03D 15/00 |
| 2002/0194934 | A1 * | 12/2002 | Taylor | G01L 1/205 73/862.046 |
| 2005/0145288 | A1 * | 7/2005 | Liue | D03D 49/44 139/11 |
| 2006/0258205 | A1 | 11/2006 | Locher et al. | |
| 2006/0258247 | A1 * | 11/2006 | Tao | D03D 1/0088 442/301 |
| 2007/0089800 | A1 * | 4/2007 | Sharma | D02G 3/441 139/388 |
| 2013/0118633 | A1 | 5/2013 | Studer et al. | |
| 2013/0137326 | A1 * | 5/2013 | Tseng | D03D 1/0058 442/210 |
| 2013/0155020 | A1 | 6/2013 | Heubel et al. | |
| 2014/0035218 | A1 * | 2/2014 | Koyama | B65H 31/20 271/3.14 |
| 2014/0246415 | A1 * | 9/2014 | Wittkowski | B60N 2/5685 219/201 |
| 2015/0091820 | A1 * | 4/2015 | Rosenberg | G06F 3/0414 345/173 |
| 2015/0342307 | A1 * | 12/2015 | Weber | A44C 5/00 368/282 |
| 2015/0362115 | A1 * | 12/2015 | Arnold | F16L 55/162 138/98 |
| 2016/0018274 | A1 * | 1/2016 | Seitz | G01D 5/2417 73/862.626 |
| 2016/0048236 | A1 * | 2/2016 | Poupyrev | G06F 3/044 345/174 |
| 2016/0287453 | A1 * | 10/2016 | Cavolt | A61F 13/08 |
| 2017/0224280 | A1 * | 8/2017 | Bozkurt | G01L 5/0014 |
| 2017/0321353 | A1 * | 11/2017 | Clement | D03D 1/0058 |
| 2018/0195218 | A1 * | 7/2018 | Hamada | D04B 21/14 |
| 2019/0018544 | A1 * | 1/2019 | Rosenberg | G06F 3/044 |

FOREIGN PATENT DOCUMENTS

| | | |
|---|---|---|
| CN | 103097597 A | 5/2013 |
| DE | 102009013874 A1 | 9/2010 |
| EP | 2361867 A2 | 8/2011 |
| EP | 1723276 B1 | 5/2012 |
| WO | 2008044202 A2 | 4/2008 |
| WO | 2015193602 A1 | 12/2015 |

* cited by examiner

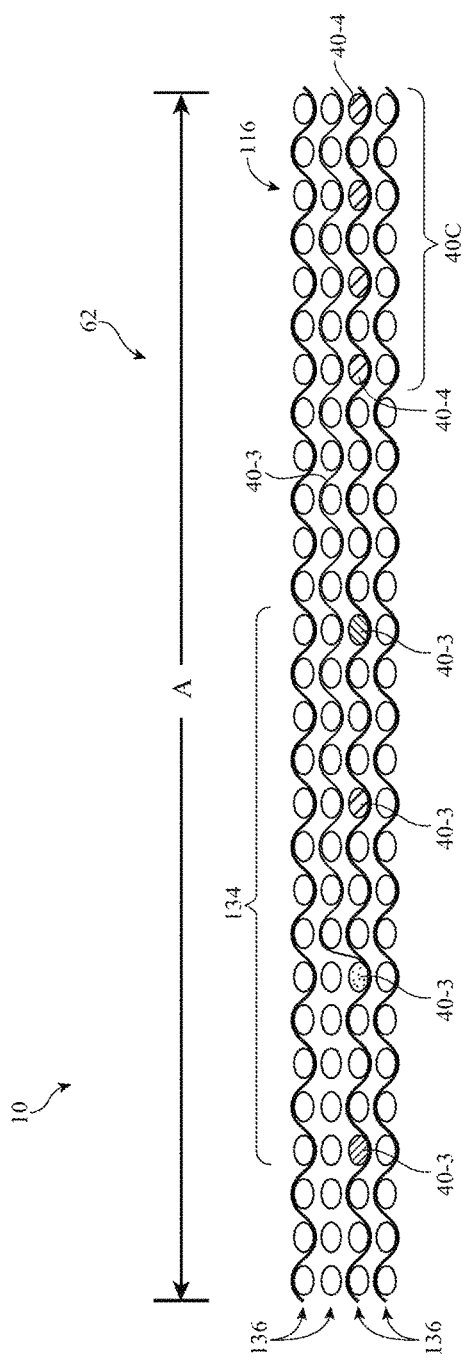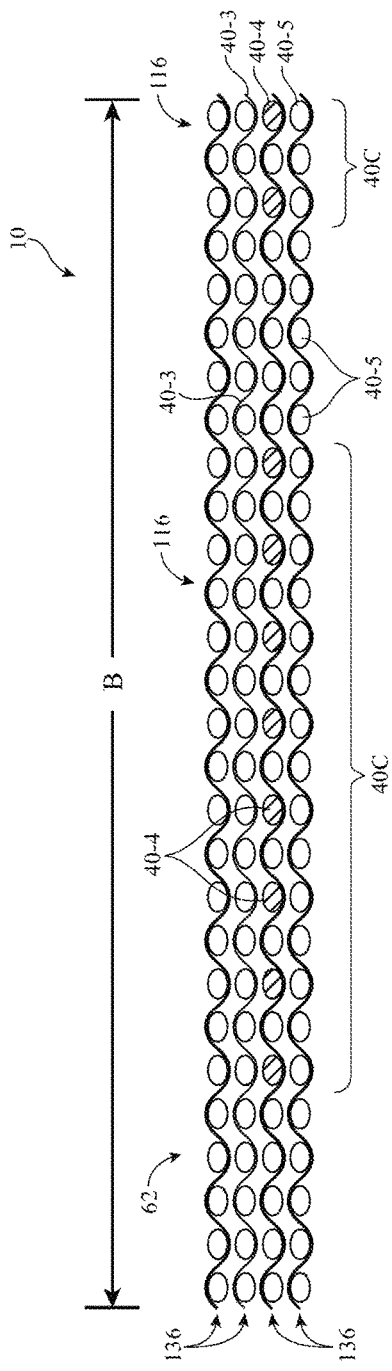

CONDUCTIVE SIGNAL PATHS IN WOVEN FABRICS

This application claims priority to U.S. provisional patent application No. 62/095,668, filed on Dec. 22, 2014, which is hereby incorporated by reference herein in its entirety.

BACKGROUND

This relates generally to electronic devices and, more particularly, to electronic devices that include fabrics having conductive signal paths.

In traditional woven fabrics, warp and weft threads are orthogonal to one another, with the warp threads extending along the length of the fabric and the weft threads weaving back and forth across the warp threads. In needle weaving, weft threads are fed from one or both sides of the warp threads and are inserted into the fabric using a guide arm that guides the weft thread across the warp threads.

It can be challenging to form conductive signal paths in woven fabrics. Having warp threads restricted to one direction and weft threads restricted to a different direction can place undesirable limitations on the layout of conductive signal paths formed by conductive threads in the fabric. For example, to form a conductive signal path that changes from a warp direction to a weft direction, a conductive warp thread would need to be electrically connected to a conductive weft thread. This type of connection may be difficult to maintain and can lead to undesirable breaks in the signal path if the fabric is stressed.

It would therefore be desirable to be able to form woven fabrics with improved conductive signal paths.

SUMMARY

Fabric may be formed by weaving warp strands and weft strands together using weaving equipment. The weaving equipment may include strand positioning equipment that positions the warp strands to produce a shed and that inserts weft strands into the shed between the warp strands to form the fabric.

The weaving equipment may include one or more guide arms that pushes warp strands in the weft direction during weaving. Fabrics having warp strands that extend in both the warp direction and the weft direction may be used in forming circuitry in fabrics such as touch sensor circuitry. For example, a touch sensor in a fabric may be formed using first conductive warp strands that form first touch sensor electrodes and second conductive warp strands that form second touch sensor electrodes that overlap with the first touch sensor electrodes. The second conductive warp strands may each have a first portion that extends in the warp direction and a second portion that extends in the weft direction across the first touch sensor electrodes.

Fabrics having warp strands that extend in both the warp direction and the weft direction may be used in forming fabric-based items such as touch-sensitive wrist bands. For example, a fabric-based wrist band may be coupled to an electronic device such as an electronic wrist-watch. The wrist band may have touch-sensitive regions capable of detecting touch input from a user. The touch-sensitive regions may be formed from an overlapping region of conductive warp threads extending in the warp direction and conductive warp threads extending in the weft direction.

The wrist band may have an end region that is attached to the electronic device. Touch sensor signals may be conveyed between the electronic device and the wrist band via the end region. Conductive warp strands that form horizontal touch sensor electrodes in the wrist band and conductive warp strands that form vertical touch sensor electrodes in the wrist band may be routed to the end region of the wrist band to electrically connect to one or more terminals in the electronic device.

BRIEF DESCRIPTION OF THE DRAWINGS

FIG. 13 is a cross-sectional side view of a first section of the wrist band of FIGS. 9 and 10 showing how covered conductive signal paths can be formed from warp strands that extend in the weft direction in accordance with an embodiment.

FIG. 14 is a cross-sectional side view of a second section of the wrist band of FIGS. 9 and 10 showing warp strands that extend in the weft direction to form horizontal electrodes and warp strands that extend in the warp direction to form covered vertical electrodes in accordance with an embodiment.

DETAILED DESCRIPTION

Figure 1:
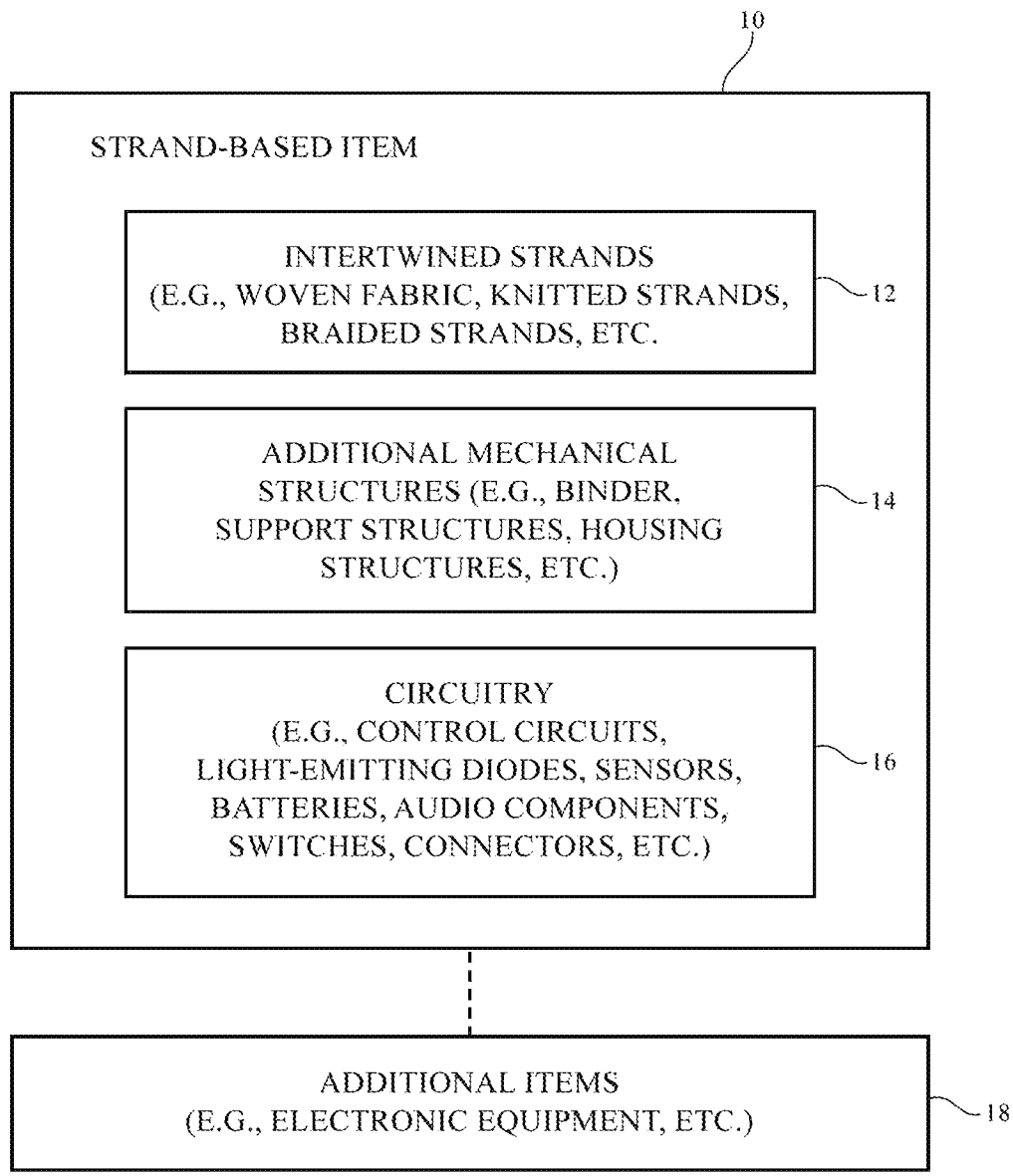
FIG. 1 is a schematic diagram of an illustrative strand-based item in accordance with an embodiment.

Conductive signal paths may be incorporated into strand-based items such as strand-based item 10 of FIG. 1. Item 10 may be an electronic device or an accessory for an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, etc.), or may be any other suitable fabric-based item.

Strands in strand-based item 10 may form all or part of a housing wall for an electronic device, may form internal structures in an electronic device, or may form other strand-based structures. Strand-based item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

Item 10 may include intertwined strands 12. The strands may be intertwined using strand intertwining equipment such as weaving equipment, knitting equipment, or braiding equipment. Intertwined strands 12 may, for example, form woven fabric.

Strands 12 may be single-filament strands or may be threads, yarns, or other strands that have been formed by intertwining multiple filaments of material together. Strands may be formed from polymer, metal, glass, graphite, ceramic, natural fibers such as cotton or bamboo, or other organic and/or inorganic materials and combinations of these materials. Conductive coatings such as metal coatings may be formed on non-conductive strands (e.g., plastic cores) to make them conductive. Reflective coatings such as metal coatings may be applied to strands to make them reflective. Strands may also be formed from single-filament metal wire, multifilament wire, or combinations of different materials. Strands may be insulating or conductive. Strands may be conductive along their entire length or may have conductive segments (e.g., metal portions that are exposed by locally removing insulation or that are formed by adding a conductive layer to a portion of a non-conductive strand.). Threads and other multifilament yarns that have been formed from intertwined filaments may contain mixtures of conductive fibers and insulating fibers (e.g., metal strands or metal coated strands with or without exterior insulating layers may be used in combination with solid plastic fibers or natural fibers that are insulating).

Item 10 may include additional mechanical structures 14 such as polymer binder to hold strands 12 together, support structures such as frame members, housing structures (e.g., an electronic device housing), and other mechanical structures.

Circuitry 16 may be included in item 10. Circuitry 16 may include components that are coupled to strands 12, components that are housed within an enclosure formed by strands 12, components that are attached to strands 12 using welds, solder joints, adhesive bonds (e.g., conductive adhesive bonds), crimped connections, or other electrical and/or mechanical bonds. Circuitry 16 may include metal structures for carrying current, integrated circuits, discrete electrical components such as resistors, capacitors, and inductors, switches, connectors, light-emitting components such as light-emitting diodes, audio components such as microphones and speakers, vibrators, solenoids, piezoelectric devices, and other electromechanical devices, connectors, microelectromechanical systems (MEMs) devices, pressure sensors, light detectors, proximity sensors, force sensors, moisture sensors, temperature sensors, accelerometers, gyroscopes, compasses, magnetic sensors, touch sensors, and other sensors, components that form displays, touch sensors arrays (e.g., arrays of capacitive touch sensor electrodes to form a touch sensor that detects touch events in two dimensions), and other input-output devices. Circuitry 16 may also include control circuitry such as non-volatile and volatile memory, microprocessors, application-specific integrated circuits, system-on-chip devices, baseband processors, wired and wireless communications circuitry, and other integrated circuits.

Item 10 may interact with electronic equipment or other additional items 18. Items 18 may be attached to item 10 or item 10 and item 18 may be separate items that are configured to operate with each other (e.g., when one item is a case and the other is a device that fits within the case, etc.).

As shown in FIG. 1, circuitry 16 may include antennas and other structures for supporting wireless communications with item 18. Item 18 may also interact with strand-based item 10 using a wired communications link or other connection that allows information to be exchanged.

In some situations, item 18 may be an electronic device such as a cellular telephone, computer, or other portable electronic device and strand-based item 10 may form a case or other structure that receives the electronic device in a pocket, an interior cavity, or other portion of item 10. In other situations, item 18 may be a wrist-watch device or other electronic device and item 10 may be a strap of other strand-based item that is attached to item 18. In still other situations, item 10 may be an electronic device, strands 12 may be used in forming the electronic device, and additional items 18 may include accessories or other devices that interact with item 10.

If desired, magnets and other structures in items 10 and/or 18 may allow items 10 and 18 to interact wirelessly. One item may, for example, include a magnet that produces a magnetic field and the other item may include a magnetic switch or magnetic sensor that responds in the presence of the magnetic field. Items 10 and 18 may also interact with themselves or each other using pressure-sensitive switches, pressure sensors, force sensors, proximity sensors, light-based sensors, interlocking electrical connectors, etc.

The strands that make up item 10 may be intertwined using any suitable strand intertwining equipment. With one suitable arrangement, which may sometimes be described herein as an example, strands 12 may be woven together to form a fabric. The fabric may have a plain weave, a satin weave, a twill weave, or variations of these weaves, may be a three-dimensional woven fabric, or may be other suitable fabric.

Figure 2:
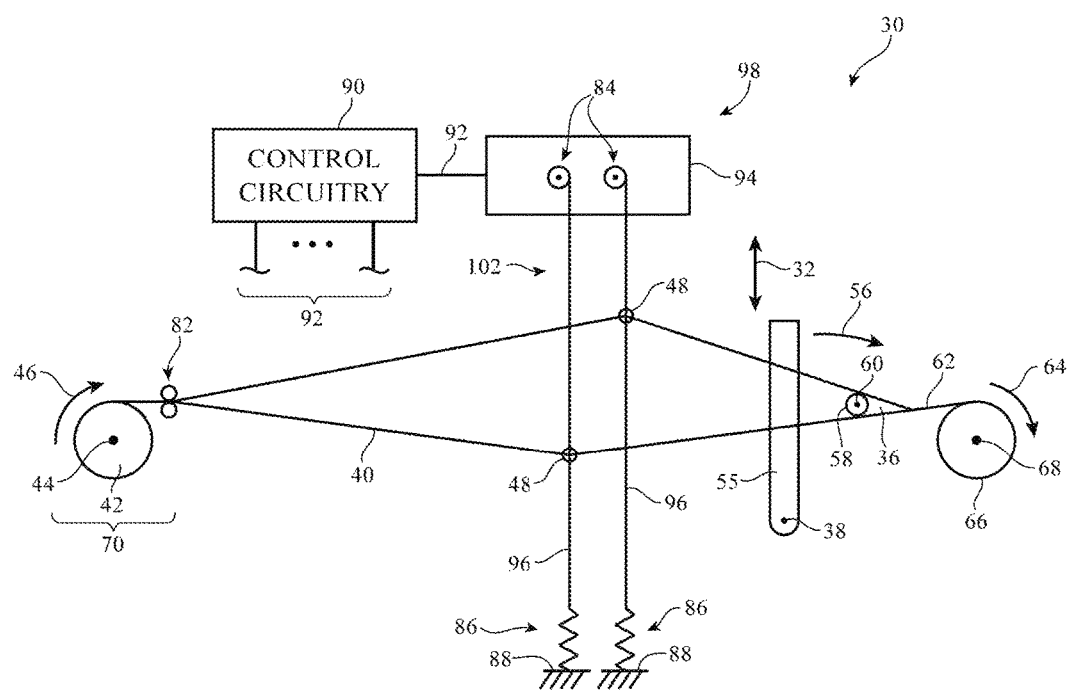
FIG. 2 is a side view of illustrative weaving equipment that may be used to form fabric in accordance with an embodiment.

Illustrative weaving equipment for forming woven fabric for items such as item 10 of FIG. 1 is shown in FIG. 2. As shown in FIG. 2, weaving equipment 30 may be provided with strands such as strands 12 of FIG. 1 from strand source

70. The strands provided by strand source 70 may be single filaments of material or may be threads, yarns, or other multifilament strands that have been formed by intertwining multiple single-filament strands. Strands may be formed from insulating materials, conductive materials, and combinations of insulating and conductive materials.

Source 70 may supply warp strands 40 from warp beam 42. Warp beam 42 may be implemented using a drum or other structure that rotates about rotational axis 44 in direction 46. Warp strands 40 may be dispensed between rollers 82 as the drum rotates.

Warp strands 40 may be positioned using warp strand positioning equipment 98. Equipment 98 may include strand positioning structures such as harness 102. Harness 102 may be controlled using control circuitry 90 to control the positions of strands 40.

As shown in FIG. 2, harness 102 may include heddles 96. Heddles 96 may each include an eye 48 mounted on a wire that extends between a respective one of springs 86 and a respective one of wire positioners 84 or may use other structures for positioning warp strands 40. Each warp strand may pass through a respective one of heddles 96. Wire positioners 84 may be motors (e.g., stepper motors) or other electromechanical actuators. Some or all of heddles 96 may be independently positioned. During operation, control circuitry 90 may supply control signals on outputs 92 that move each heddle by a desired amount (e.g., up or down in directions 32). If desired, heddles 96 may be raised and lowered in various patterns in response to control signals from control circuitry 90 to create different patterns of gaps (sheds) 36 between warp strands 40.

Weft strand 60 may be inserted into sheds 36 during weaving to form fabric 62. Weft strand positioning equipment 58 may be used to place weft strand 60 between the warp strands that form each shed 36. Weft strand positioning equipment 58 may include one or more shuttles or may include shuttleless weft strand positioning equipment (e.g., needle weft strand positioning equipment, rapier weft strand positioning equipment, or other weft strand positioning equipment such as equipment based on projectiles, air or water jets, etc.).

After each pass of weft strand 60 through shed(s) 36, reed 55 may be moved in direction 56 (e.g., reed 55 may be rotated about axis 38) to push the weft strand that has just been inserted into the shed between respective warp strands 40 against previously woven fabric 62, thereby ensuring that a satisfactorily tight weave is produced. Fabric 62 that has been woven in this way may be gathered on take-down roller 66 as roller 66 rotates in direction 64 about rotational axis 68. Reed 55 and weft strand positioning equipment 58 may be controlled by control signals from control outputs 92.

Weaving equipment 30 may be used to push warp strands in the weft direction to form continuous conductive signal paths that extend in both the warp direction and the weft direction. FIGS. 3, 4, 5, and 6 show illustrative steps involved in using equipment 30 to manipulate warp strands such that the warp strands extend in both the warp direction (e.g., direction 104) and the weft direction (e.g., direction 106)

Figure 3:
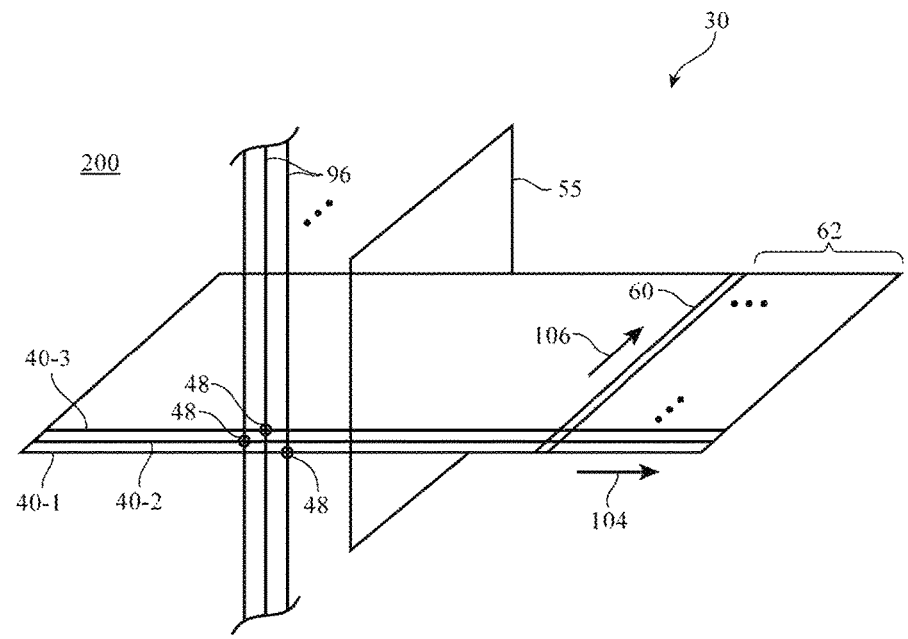
FIGS. 3, 4, 5, and 6 show illustrative steps involved in using weaving equipment of the type shown in FIG. 2 to manipulate warp strands such that the warp strands extend in both the warp direction and the weft direction in accordance with an embodiment.

At step 200 of FIG. 3, shed 36 (FIG. 2) is closed and warp strands 40 are level with one another as heddles 96 change the positions of warp strands 40. At this stage, some of heddles 96 may be in the process of raising warp strands 40 (e.g., warp strands 40-1) while other heddles 96 may be in the process of lowering warp strands 40 (e.g., warp strands 40-2). Reed 55 may be in an upright position after having pushed weft strands 60 against previously woven fabric 62.

Figure 4:
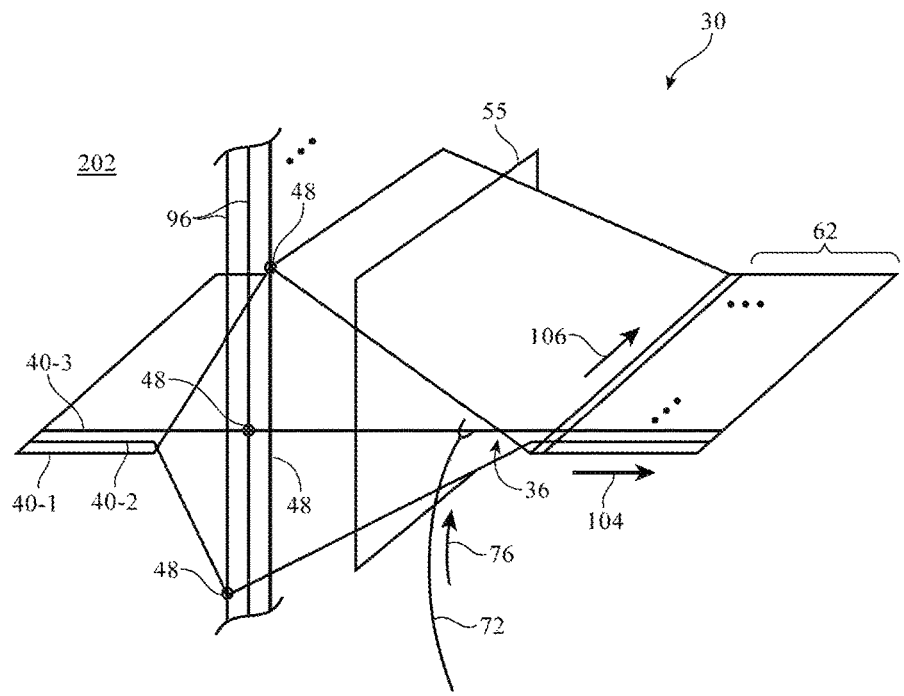

At step 202 of FIG. 4, shed 36 is opened as warp strands 40-1 are raised by heddles 96 and as warp strands 40-2 are lowered by heddles 96. When shed 36 is open, strand positioning equipment 72 may be used to push warp strand 40-3 in direction 76 to insert warp strand 40-3 between warp strands 40-1 and 40-2 that form shed 36. Strand positioning equipment 72 may be the same positioning equipment that inserts weft strands 60 into shed 36 (e.g., a shuttle or shuttleless weft strand positioning equipment) or strand positioning equipment 72 may include a separate guide arm that is designated for moving warp strands 40 in weft direction 106.

Figure 5:
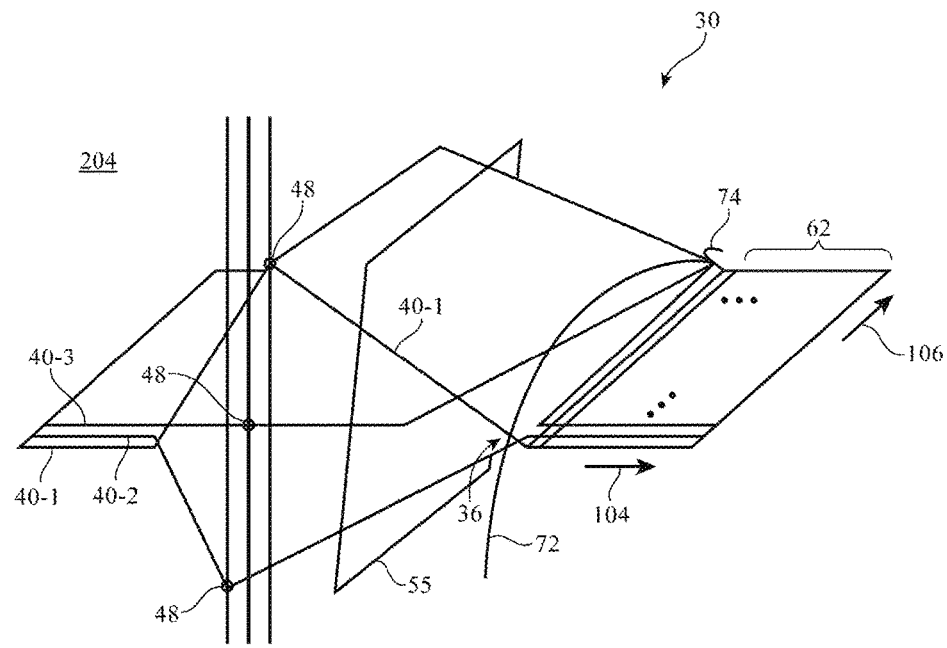

At step 204 of FIG. 5, strand positioning equipment 72 hooks onto warp strand 40-3 and pushes warp strand 40-3 through shed 36. After passing warp strand 40-3 through shed 36, strand positioning equipment 72 may hook warp strand 40-3 onto a hook member such as hook member 74 (e.g., a needle, wire, or other strand holding member).

Figure 6:
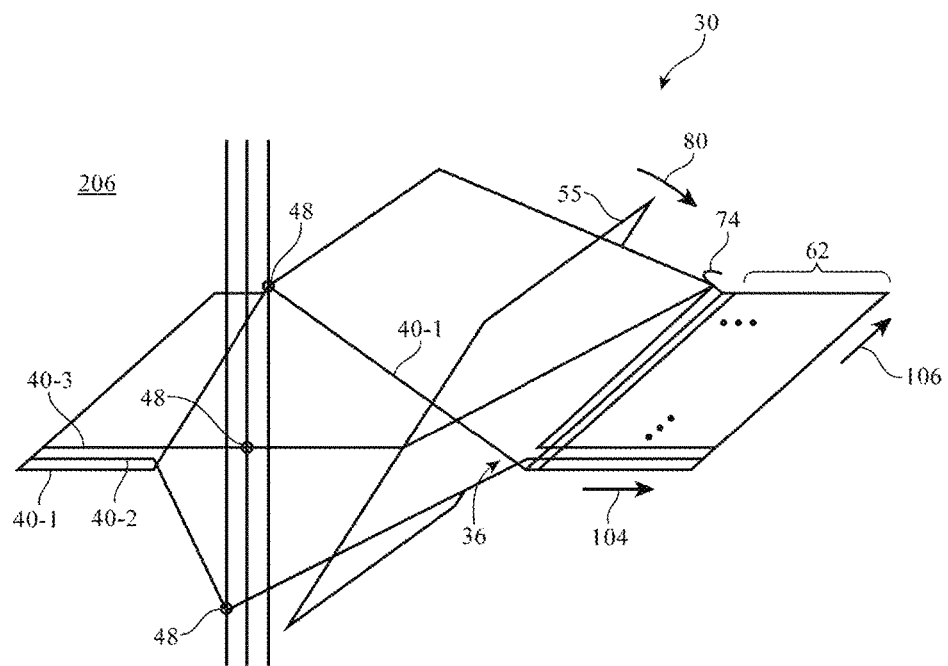

At step 206 of FIG. 6, after guide arm 72 has passed warp strand 40-3 through shed 36 and hooked warp strand 40-3 onto hook member 74, reed 55 may be moved in direction 80 to push warp strand 40-3 against previously woven fabric 62, thereby ensuring that a satisfactorily tight weave is produced. Following step 206, warp strand 40-3 may extend in both warp direction 104 (e.g., parallel to other warp strands 40) and weft direction 106 (e.g., parallel to other weft strands 60). In arrangements where warp strand 40-3 is conductive, warp strand 40-3 may form a continuous conductive signal path in fabric 62 that extends in two different directions without requiring a physical and electrical connection between two distinct strands.

The example of FIGS. 3-6 where weft strands 60 are inserted from one side of shed 36 is merely illustrative. If desired, weaving equipment 30 may include strand positioning equipment (e.g., guide arms 72, shuttle 58, etc.) on both sides of shed 36 so that one guide arm can insert strands in the weft direction from one side of shed 36 and another guide arm can insert strands in the weft direction from an opposing side of shed 36.

Figure 7:
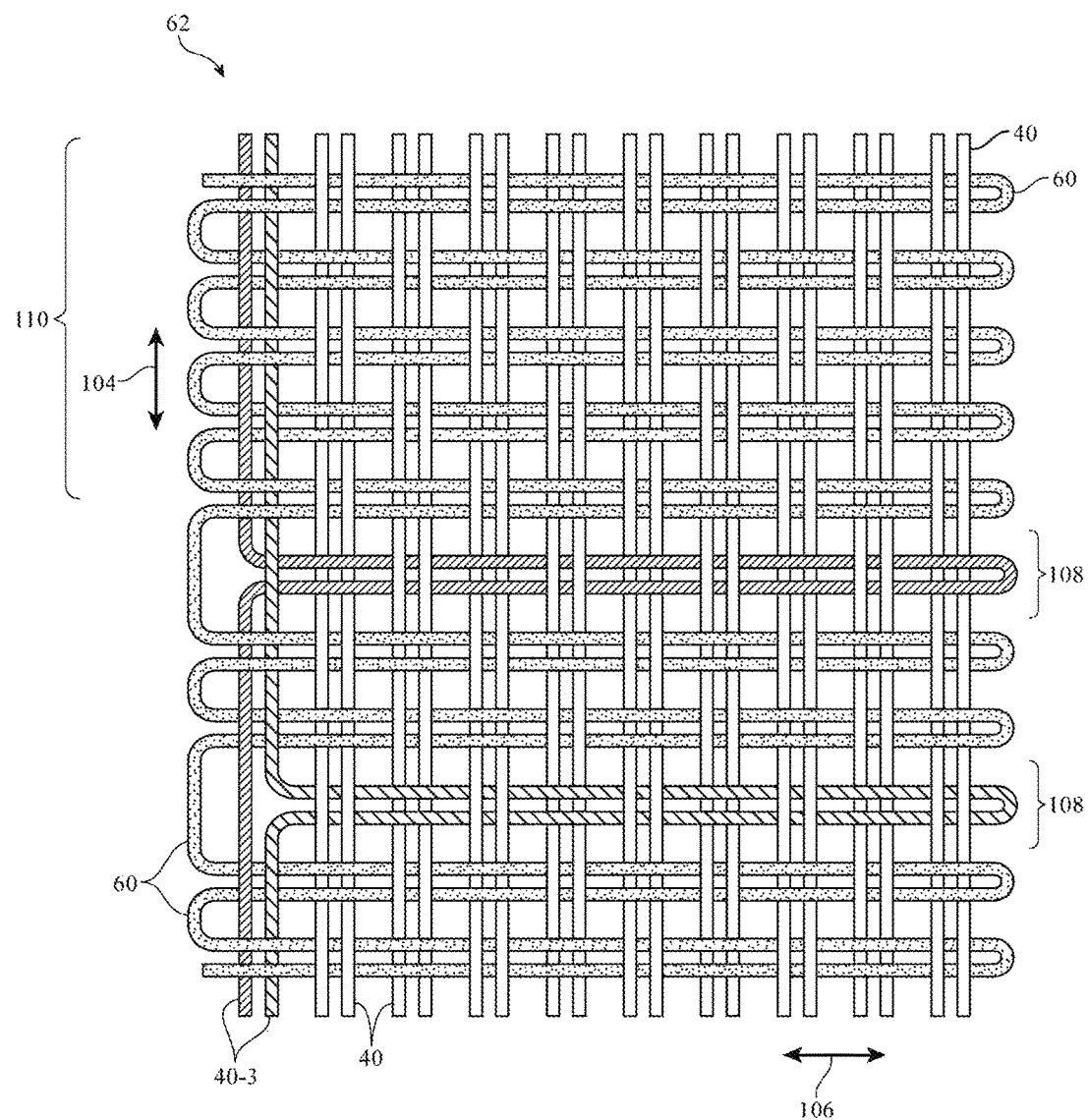
FIG. 7 is a top view of an illustrative woven fabric in which warp strands on one side of the fabric extend in the weft direction in accordance with an embodiment.

FIG. 7 is a top view of illustrative fabric 62 having warp strands 40 that are altered to extend in the weft direction. As shown in FIG. 7, altered warp strands such as warp strands 40-3 may each have a first portion such as portion 110 extending parallel to warp strands 40 in direction 104 and a second portion such as portion 108 extending parallel to weft strands 60 in direction 106. This allows continuous conductive signal paths in fabric 62 to change direction without requiring a connection between a warp strand 40 and a weft strand 60. This is, however, merely illustrative. If desired, conductive signal paths may be formed using single strands that extend in both warp direction 104 and weft direction 106 (e.g., as shown by warp strands 40-3) and/or may be formed using multiple strands such as a first strand that extends in warp direction 104 and a second strand that extends in weft direction 106.

Figure 8:
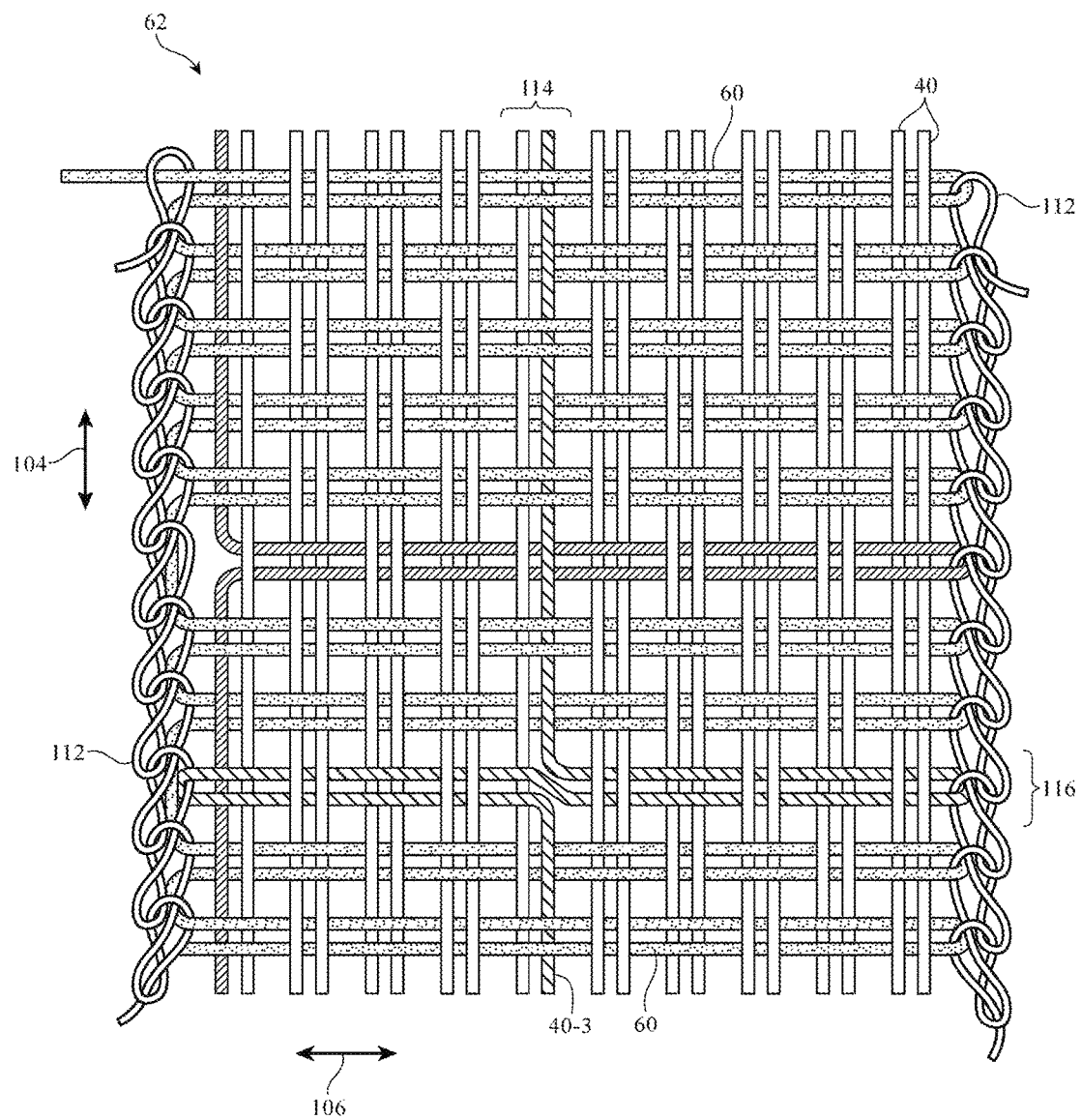
FIG. 8 is a top view of an illustrative woven fabric in which warp strands on opposing sides of the fabric extend in the weft direction in accordance with an embodiment.

FIG. 8 is a top view of another illustrative configuration for fabric 62. Fabric 62 of FIG. 8 may be formed using weaving equipment having multiple strand positioning arms (e.g., multiple guide arms such as guide arms 72 of FIGS. 3-6). The use of multiple guide arms 72 allows more flexibility in determining the locations at which warp strands 40 change direction in fabric 62. In the example of FIG. 8, warp strand 40-3 extends in warp direction 104 in middle region 114 of fabric 62 and extends in weft direction 106 in region 116 of fabric 62. This allows conductive signal paths in fabric 62 to change direction in any desired location in fabric 62. In general, conductive signal paths formed by warp strands that extend in both the warp direction and the weft direction may change direction in any suitable location of fabric 62 (e.g., at the edges of fabric 62 as shown in the example of FIG. 7, in a middle region of fabric 62 as shown in the example of FIG. 8, etc.). If desired, strands 112 may be intertwined with fabric 62 on opposing sides of fabric 62 to hold weft strands 60 (and warp strands 40-3 that form weft strands) in place.

Figure 9:
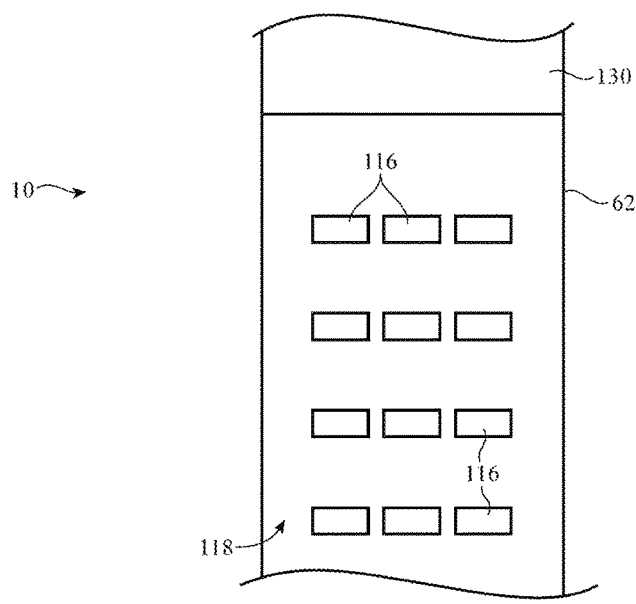
FIG. 9 is a top view of an illustrative strand-based item such as a wrist band having touch-sensitive regions formed from conductive signal paths in woven fabric in accordance with an embodiment.

Conductive strands that change from warp direction to weft direction in a woven fabric may be used to form electrical circuits in fabric-based items. FIG. 9 shows an illustrative strand-based item 10 that may include circuitry formed from conductive strands that extend in both the warp direction and the weft direction.

As shown in FIG. 9, strand-based item 10 may include woven fabric 62 that forms a wrist band. Wrist band 10 may be used to hold a device such as device 130 (e.g., an electronic wrist-watch or other device such as device 18 of FIG. 1) against a user's wrist or wrist band 10 may be worn by itself on a user's wrist. Wrist band 10 may include circuitry such as touch sensor 118 formed from conductive strands in fabric 62. Touch sensor 118 may include touch-sensitive regions such as touch-sensitive regions 116. If desired, the entirety of wrist band 10 may be touch-sensitive, only a portion of wrist band 10 may be touch-sensitive, or wrist band 10 may include discrete regions that form touch-sensitive buttons for performing particular types of user input operations. For example, touch-sensitive regions 116 may form power buttons, telephone call control buttons, volume control buttons, menu buttons, and/or other suitable buttons. If desired, touch-sensitive regions 116 may be used to provide input to electronic device 130.

The touch sensor elements that form touch sensor 118 may be based on any suitable touch sensor technology such as capacitive touch technology, resistive touch technology, acoustic touch technology, or force-sensor-based touch technology (as examples). In capacitive touch sensors, capacitive electrodes may be formed from a conductive material. For example, in fabric-based items where the touch sensor is formed in fabric, the touch sensor electrodes may be formed from conductive strands (e.g., a group of conductive strands that together form a conductive pad or strip) that are intertwined in the fabric. Configurations in which touch sensor 118 is a capacitive touch sensor and in which touch sensor electrodes for touch sensor 118 are formed from conductive strands in fabric 62 are sometimes described herein as an example. Other types of arrangements may be used for touch sensor 118 if desired (e.g., arrangements with non-capacitive touch sensors, etc.).

Figure 10:
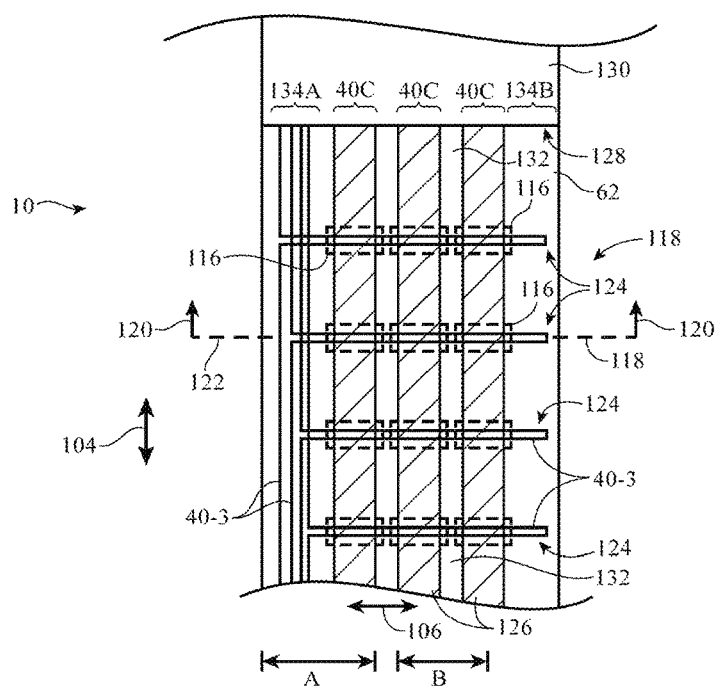
FIG. 10 is a diagram of the wrist band of FIG. 9 showing how touch-sensitive regions can be formed from warp strands that extend in the weft direction to form horizontal electrodes and warp strands that extend in the warp direction to form vertical electrodes in accordance with an embodiment.

FIG. 10 is a diagram of wrist band 10 of FIG. 9 showing how touch-sensitive regions 116 of touch sensor 118 may be formed from warp strands that extend in both the warp and weft directions (e.g., as described in connection with FIGS. 3-8). As shown in FIG. 10, touch sensor 118 may include electrodes 124 and 126. Electrodes 124 and 126 may have any suitable shape (e.g., square shape, diamond shape, rectangular shape, etc.). In the illustrative configuration of FIG. 10, electrodes 124 and 126 have an elongated rectangular shape that runs across fabric 62. Electrodes 126 run vertically between edge 128 and an opposing edge of fabric 62 (e.g., electrodes 126 may extend along the length of wrist band 10). Electrodes 124 run horizontally between the left and right edges of fabric 62 (e.g., electrodes 124 may extend along the width of wrist band 10). A layer of dielectric (e.g., one or more non-conductive strands in fabric 62) may be interposed between electrodes 124 and 126. By monitoring capacitance changes associated with horizontal and vertical electrodes 124 and 126, touch sensor 118 may be used to ascertain the location of an external object such as a user's finger during a touch event (e.g., when a user of device 10 brings his or her finger in contact with or in close proximity to touch sensor 118 of fabric 62).

Touch sensor 118 on wrist band 10 may communicate with electronic device 130 that is coupled to wrist band 10. For example, touch sensor data gathered by touch sensor 118 may be conveyed from touch sensor 118 to electronic device 130, and touch sensor control signals may be supplied from electronic device 130 to touch sensor 118. Wrist band 10 may be mechanically and electrically coupled to device 130 at end region 128 of wrist band 10. Because electrical signals are conveyed to and from device 130 at end region 128 of wrist band 10, it may be desirable to use warp strands in fabric 62 to form the conductive signal paths of touch sensor 118 since warp strands are already routed to end region 128.

Horizontal electrodes 124 and vertical electrodes 126 of touch sensor 118 may be formed from conductive strands in fabric 62. For example, each vertical electrode 126 may be formed from a group 40C of conductive warp strands. Each group 40C may include a plurality of conductive warp strands (e.g., two, three, ten, more than ten, or less than ten conductive warp strands) arranged adjacent to one another in fabric 62. In this way, individual conductive strands can be grouped with other conductive strands to form a larger conductive area that can be used as a capacitive touch sensor electrode. Groups 40C of conductive warp strands may be separated from one another by nonconductive regions 132 (e.g., regions of fabric 62 that are formed using nonconductive strands or strands with nonconductive portions). As shown in FIG. 10, groups 40C of conductive warp strands may be electrically coupled to device 130 at end region 128 of wrist band 10.

Horizontal electrodes 124 may be formed using conductive strands that extend across electrodes 126 in weft direction 106. For example, horizontal electrodes 124 may be formed from conductive weft strands and/or may be formed from conductive warp strands that extend in the weft direction (e.g., as described in connection with FIGS. 3-8). This type of arrangement is shown in FIG. 10. As shown in FIG. 10, warp strands 40-3 extend in warp direction 104 in region 134A of wrist band 10 (e.g., an edge region on one side of vertical electrodes 126). In regions where touch-sensitive buttons 116 are formed, one or more warp strands 40-3 extends across vertical electrodes 126 in weft direction 106 to form a horizontal electrode 126 that crisscrosses with vertical electrodes 124. The example of FIG. 10 in which warp strands 40-3 are located on side 134A of vertical electrodes 126 is merely illustrative. If desired, warp strands 40-3 may be located on side 134B of vertical electrodes 126 and may extend across electrodes 126 from side 134B to side 134A. In other arrangements, touch sensor 118 may include warp strands 40-3 on both side 134A and side 134B of vertical electrodes 126.

Regions of overlap between electrodes 126 and 124 may form touch-sensitive buttons 116. In the example of FIG. 10, each touch-sensitive button 116 is formed using multiple warp strands 40C and a single warp-to-weft strand 40-3. This is, however, merely illustrative. In general, each touch-sensitive button 116 may be formed using any number of strands extending in the warp direction (e.g., one, two, ten, more than ten, less than ten, etc.) and any number of strands extending in the weft direction (e.g., one, two, ten, more than ten, less than ten, etc.).

During operation, electrodes 126 may serve as drive electrodes and electrodes 124 may serve as sense electrodes. A signal such as an alternating current drive signal may be imposed on each drive electrode 126 using conductive signal paths 40C. Conductive signal paths 40C may each have one end that is connected to a terminal in device 130. Sense signals on sense electrodes 126 may be conveyed to device 130 using conductive signal paths 40-3 in region 134A. Conductive signal paths 40-3 may each have one end that is connected to a terminal in device 130.

Figure 11:
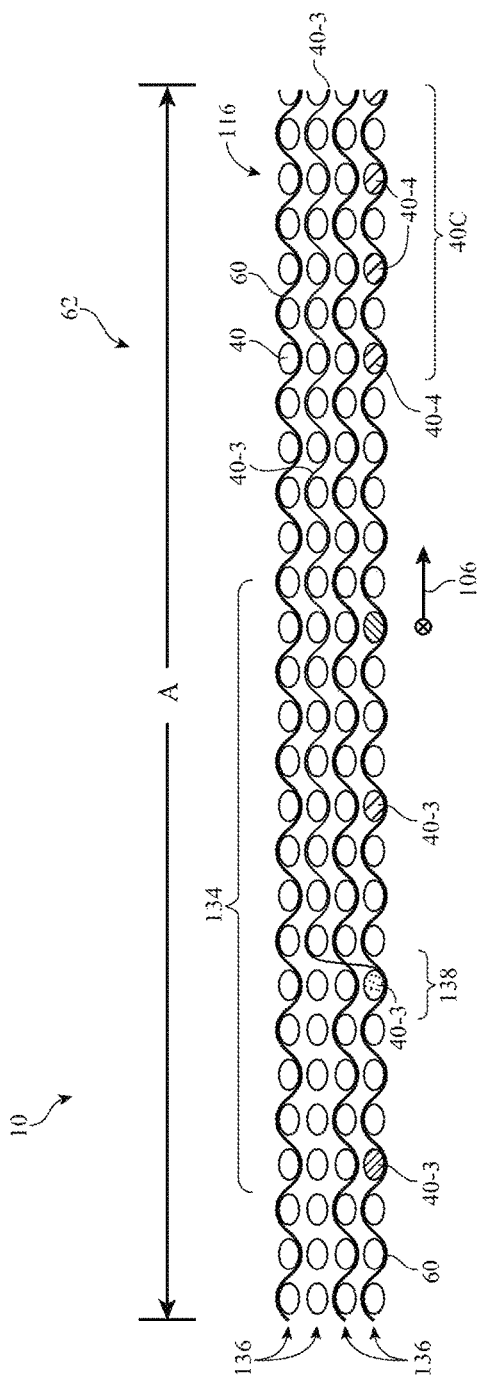
FIG. 11 is a cross-sectional side view of a first section of the wrist band of FIGS. 9 and 10 showing how exposed conductive signal paths can be formed from warp strands that extend in the weft direction in accordance with an embodiment.

A cross-section of region A of wrist band 10 taken along line 122 and viewed in direction 120 is shown in FIG. 11. As shown in FIG. 11, fabric 62 may include multiple layers 136 of strands. Each layer may include intertwined warp strands 40 and weft strands 60. Some of warp strands 40 and/or weft strands 60 may be conductive and some may be non-conductive. For example, warp strands 40-4 in groups 40C extending in warp direction 104 may be conductive and may be used in forming touch sensor electrodes 126 of FIG. 10. Warp strands 40-3 extending in weft direction 106 may be conductive and may be used in forming touch sensor electrodes 124 of FIG. 10.

Non-conductive strands (e.g., non-conductive warp strands 40-5 and/or non-conductive weft strands 60) may be used to separate conductive strands to prevent short circuits between the conductive signal paths of touch sensor 118. For example, one or more layers of non-conductive warp strands 40-5 may be interposed between warp strands 40-3 that form electrodes 124 of FIG. 10 and warp strands 40-4 that form electrodes 126 of FIG. 10. Non-conductive warp strands 40-5 may also be used to separate adjacent groups 40C of conductive warp strands 40-4 and to separate adjacent signal paths formed by warp strands 40-3 in region 134.

The cross-section of region A of wrist band 10 shows how warp strand 40-3 in region 134 of fabric 62 changes from a warp direction (direction 104) to a weft direction (direction 106). The warp portion of strand 40-3 conveys electrical signals between electrodes 124 and device 130. The weft portion of strand 40-3 forms a horizontal touch sensor electrode over conductive warp strands 40-4 to form touch-sensitive buttons 116 in touch sensor 118.

Figure 12:
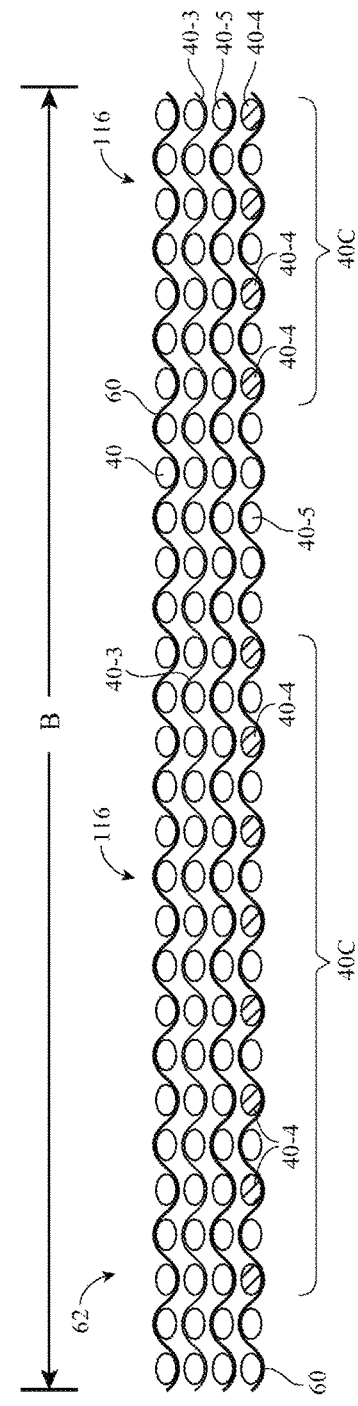
FIG. 12 is a cross-sectional side view of a second section of the wrist band of FIGS. 9 and 10 showing warp strands that extend in the weft direction to form horizontal electrodes and warp strands that extend in the warp direction to form exposed vertical electrodes in accordance with an embodiment.

A cross-section of region B of wrist band 10 taken along line 122 and viewed in direction 120 is shown in FIG. 12. FIG. 12 shows how the weft portion of warp strand 40-3 extends across multiple discrete conductive regions 40C formed by warp strands 40-4 to form a row of touch-sensitive buttons 116 in fabric 62.

In the examples of FIGS. 11 and 12, some of the conductive strands of touch sensor 118 are formed on an outermost layer of fabric 62. With this type of configuration, some conductive portions of touch sensor 118 are exposed to the exterior of fabric 62. Exposing conductive portions of wrist band 10 may allow electrical connections to be formed directly with the circuitry of wrist band 10. This type of arrangement may also allow a different type of cover layer to be used to cover the conductive portions of wrist band 10 (e.g., a material other than a layer of fabric such as plastic, metal, thin film, etc.).

In some embodiments, it may be desirable to cover the conductive portions of wrist band 10 with fabric such that the circuitry is completely contained within the wrist band and is not exposed to the exterior of fabric 62. This type of arrangement is illustrated in FIGS. 13 and 14.

FIG. 13 shows a cross-section of region A of wrist band 10 taken along line 122 and viewed in direction 120. The cross-section of region A of wrist band 10 shows how warp strand 40-3 in region 134 of fabric 62 changes from a warp direction (direction 104) to a weft direction (direction 106). The warp portion of strand 40-3 conveys electrical signals between electrodes 124 and device 130. The weft portion of strand 40-3 forms a horizontal touch sensor electrode over conductive warp strands 40-4 to form touch-sensitive buttons 116 in touch sensor 118.

As shown in FIG. 13, at least one layer 136 of non-conductive strands 40-5 is formed on both sides of conductive strands 40-3 and 40-4. This type of arrangement may be used to ensure that some or all of the conductive portions of fabric 62 are not exposed to the exterior of the fabric or viewable by a user wearing wrist band 10.

FIG. 14 shows a cross-section of region B of wrist band 10 taken along line 122 and viewed in direction 120. FIG. 14 shows how the weft portion of warp strand 40-3 extends across multiple discrete conductive regions 40C formed by warp strands 40-4 to form a row of touch-sensitive buttons 116 in fabric 62. As shown in FIG. 14, at least one layer 136 of non-conductive strands 40-5 is formed on both sides of conductive strands 40-3 and 40-4, ensuring that some or all of the conductive portions of fabric 62 are not exposed to the exterior of the fabric or viewable by a user wearing wrist band 10.

The example of FIGS. 9-14 in which strand-based item 10 is a wrist band and electronic device 130 is an electronic wrist-watch device is merely illustrative. In general, fabrics 62 having strands that extend in both the warp and weft direction may be used to form any suitable type of strand-based item and may be coupled to any suitable type of electronic equipment.

In accordance with an embodiment, a fabric is provided that includes first conductive warp strands that form first touch sensor electrodes, second conductive warp strands that form second touch sensor electrodes, the first touch sensor electrodes overlap the second touch sensor electrodes to form a touch sensor in the fabric, and non-conductive weft strands woven together with the first and second conductive warp strands.

In accordance with another embodiment, the first touch sensor electrodes are perpendicular to the second touch sensor electrodes.

In accordance with another embodiment, the second conductive warp strands each have a portion that extends across the first touch sensor electrodes in a direction parallel to the non-conductive weft strands.

In accordance with another embodiment, the second conductive warp strands each have a portion that extends parallel to the first conductive warp strands.

In accordance with another embodiment, the first touch sensor electrodes have an elongated rectangular shape and are each formed from a group of the first conductive warp strands.

In accordance with another embodiment, the fabric includes non-conductive warp strands that separate each group of the first conductive warp strands from an adjacent group of the first conductive warp strands.

In accordance with another embodiment, the fabric includes non-conductive warp strands interposed between the first conductive warp strands and the second conductive warp strands.

In accordance with another embodiment, the fabric includes first and second outer layers of non-conductive strands, the first conductive warp strands and the second conductive warp strands are both interposed between the first and second outer layers of non-conductive strands.

In accordance with another embodiment, one of the second conductive warp strands has a portion that extends across the first touch sensor electrodes in a first region to form a row of discrete touch-sensitive areas in the first region and another of the second conductive warp strands has a portion that extends across the first touch sensor electrodes in a second region to form a row of discrete touch-sensitive areas in the second region.

In accordance with another embodiment, the first and second conductive warp strands form touch sensor signal paths that are routed to an end region of the fabric.

In accordance with an embodiment, apparatus is provided that includes an electronic device, and a wrist band coupled to the electronic device, the wrist band includes a touch sensor formed from first conductive warp threads, second conductive warp threads that overlap the first conductive warp threads, and non-conductive weft threads that are woven together with the first and second conductive warp threads.

In accordance with another embodiment, the first conductive warp threads form first touch sensor electrodes, the second conductive warp threads form second touch sensor electrodes, and the first touch sensor electrodes are perpendicular to the second touch sensor electrodes.

In accordance with another embodiment, the second conductive warp threads each have first portion that extends parallel to the first conductive warp threads and a second portion that extends across the first touch sensor electrodes in a direction parallel to the non-conductive weft threads.

In accordance with another embodiment, the apparatus includes non-conductive warp threads interposed between the first conductive warp threads and the second conductive warp threads.

In accordance with another embodiment, the apparatus includes first and second outer layers of non-conductive threads, the first conductive warp threads and the second conductive warp threads are both interposed between the first and second outer layers of non-conductive threads.

In accordance with another embodiment, the wrist band has an end region that is attached to the electronic device and the first and second conductive warp threads form touch sensor signal paths in the wrist band that are routed to the electronic device via the end region of the wrist band.

In accordance with an embodiment, a fabric is provided that includes non-conductive warp threads, conductive warp threads, and non-conductive weft threads woven together with the non-conductive warp threads and the conductive warp threads, the conductive warp threads each have a first portion that extends parallel to the non-conductive warp threads and a second portion that extends parallel to the non-conductive weft threads.

In accordance with another embodiment, the second portion of each conductive warp thread extends across and is woven together with the non-conductive warp threads.

In accordance with another embodiment, the conductive warp threads convey electrical signals in the fabric.

In accordance with another embodiment, the fabric includes additional conductive warp threads, the second portion of each conductive warp thread overlaps the additional conductive warp threads.

In accordance with another embodiment, the fabric includes additional non-conductive warp threads that separate the conductive warp threads from the additional conductive warp threads.

The foregoing is merely illustrative and various modifications can be made by those skilled in the art without departing from the scope and spirit of the described embodiments. The foregoing embodiments may be implemented individually or in any combination.

What is claimed is:

1. A fabric, comprising:
   first conductive warp strands that form first touch sensor electrodes;
   second conductive warp strands that form second touch sensor electrodes, wherein the warp strands of the first touch sensor electrodes overlap the warp strands of the second touch sensor electrodes to form a touch sensor in the fabric that detects a location of touch input from a user's finger; and
   non-conductive weft strands that are each woven together with both the first and second overlapping conductive warp strands.

2. The fabric defined in claim 1 wherein the first touch sensor electrodes are perpendicular to the second touch sensor electrodes.

3. The fabric defined in claim 1 wherein the second conductive warp strands each have a portion that extends across the first touch sensor electrodes in a direction parallel to the non-conductive weft strands.

4. The fabric defined in claim 1 wherein the second conductive warp strands each have a portion that extends parallel to the first conductive warp strands.

5. The fabric defined in claim 1 wherein the first touch sensor electrodes have an elongated rectangular shape and are each formed from a group of the first conductive warp strands.

6. The fabric defined in claim 5 further comprising:
   non-conductive warp strands that separate each group of the first conductive warp strands from an adjacent group of the first conductive warp strands.

7. The fabric defined in claim 1 further comprising:
   non-conductive warp strands interposed between the first conductive warp strands and the second conductive warp strands.

8. The fabric defined in claim 1 further comprising:
   first and second outer layers of non-conductive strands, wherein the first conductive warp strands and the second conductive warp strands are both interposed between the first and second outer layers of non-conductive strands.

9. The fabric defined in claim 1 wherein one of the second conductive warp strands has a portion that extends across the first touch sensor electrodes in a first region to form a row of discrete touch-sensitive areas in the first region and wherein another of the second conductive warp strands has a portion that extends across the first touch sensor electrodes in a second region to form a row of discrete touch-sensitive areas in the second region.

10. The fabric defined in claim 1 wherein the first and second conductive warp strands form touch sensor signal paths that are routed to an end region of the fabric.

11. Apparatus, comprising:
    an electronic device; and
    a wrist band coupled to the electronic device, wherein the wrist band comprises a touch sensor formed from first conductive warp threads, second conductive warp threads that overlap and are perpendicular to the first conductive warp threads, and non-conductive weft threads that are each woven together with the first and second overlapping conductive warp threads.

12. The apparatus defined in claim 11 wherein the first conductive warp threads form first touch sensor electrodes and wherein the second conductive warp threads form second touch sensor electrodes.

13. The apparatus defined in claim 12 wherein the second conductive warp threads each have a first portion that extends parallel to the first conductive warp threads and a second portion that extends across the first touch sensor electrodes in a direction parallel to the non-conductive weft threads.

14. The apparatus defined in claim 11 further comprising:
non-conductive warp threads interposed between the first conductive warp threads and the second conductive warp threads.

15. The apparatus defined in claim 11 further comprising:
first and second outer layers of non-conductive threads, wherein the first conductive warp threads and the second conductive warp threads are both interposed between the first and second outer layers of non-conductive threads.

16. The apparatus defined in claim 11 wherein the wrist band has an end region that is attached to the electronic device and wherein the first and second conductive warp threads form touch sensor signal paths in the wrist band that are routed to the electronic device via the end region of the wrist band.

17. The apparatus defined in claim 11 wherein the touch sensor detects a location of touch input from a user's finger.

18. A fabric, comprising:
non-conductive warp threads;
conductive warp threads;
non-conductive weft threads woven together with the non-conductive warp threads wherein the conductive warp threads each have a first portion that extends parallel to the non-conductive warp threads and a second portion that extends parallel to the non-conductive weft threads; and
additional conductive warp threads, wherein the conductive warp threads overlap the additional conductive warp threads at the second portion and wherein the non-conductive weft threads are interwoven with the overlapping conductive warp threads and additional conductive warp threads.

19. The fabric defined in claim 18 wherein the second portion of each conductive warp thread extends across and is woven together with the non-conductive warp threads.

20. The fabric defined in claim 18 wherein the conductive warp threads convey electrical signals in the fabric.

21. The fabric defined in claim 18 further comprising:
additional non-conductive warp threads that separate the conductive warp threads from the additional conductive warp threads.

* * * * *